United States Patent [19]

Hess et al.

[11] 4,379,050
[45] Apr. 5, 1983

[54] GRANULAR FLUID BIOFILTER REVERSING

[75] Inventors: W. John Hess; Morris C. Croker, both of Walla Walla, Wash.

[73] Assignee: The United States of America as represented by the Secretary of the Army, Washington, D.C.

[21] Appl. No.: 315,551

[22] Filed: Oct. 27, 1981

[51] Int. Cl.³ .............................................. C02C 1/04
[52] U.S. Cl. ..................................... 210/151; 210/279; 210/291
[58] Field of Search ............... 210/151, 264, 278, 274, 210/275, 279, 291, 169

[56] References Cited

U.S. PATENT DOCUMENTS

| | | | |
|---|---|---|---|
| 409,970 | 8/1889 | Hyatt | 210/279 X |
| 629,942 | 8/1899 | Wanner, Jr. | 210/264 |
| 2,149,680 | 3/1939 | Jewell | 210/291 X |
| 3,543,937 | 12/1970 | Choun | 210/150 |
| 3,704,783 | 12/1972 | Antonie | 210/151 |
| 3,847,805 | 11/1974 | Voedisch | 210/279 X |
| 4,009,099 | 2/1977 | Jeris | 210/107 |
| 4,035,290 | 7/1977 | Torpey | 210/151 X |
| 4,043,936 | 8/1977 | Francis et al. | 210/610 X |
| 4,052,960 | 10/1977 | Birkbeck et al. | 119/3 |
| 4,067,809 | 1/1978 | Kato | 210/169 |
| 4,077,877 | 3/1978 | Orensten et al. | 210/169 X |
| 4,098,695 | 7/1978 | Novotny | 210/279 X |
| 4,105,555 | 8/1978 | Pease | 210/278 |
| 4,113,612 | 9/1978 | Sekoulov et al. | 210/615 |
| 4,113,613 | 9/1978 | Sekoulov et al. | 210/615 |
| 4,115,266 | 9/1978 | Ohshima | 210/500.1 |
| 4,126,544 | 11/1978 | Baensch et al. | 210/610 |
| 4,126,545 | 11/1978 | Hagiwara | 210/150 X |
| 4,140,079 | 2/1979 | Fruchtnicht | 119/3 |
| 4,141,823 | 2/1979 | Smith et al. | 210/150 X |
| 4,167,479 | 9/1979 | Besik | 210/629 X |
| 4,169,049 | 9/1979 | Salkinoja et al. | 210/610 |
| 4,169,050 | 9/1979 | Serfling et al. | 210/150 X |
| 4,181,604 | 1/1980 | Onishi et al. | 210/150 X |
| 4,181,612 | 1/1980 | Trail | 210/169 |
| 4,182,267 | 1/1980 | Kominami et al. | 119/3 |
| 4,182,675 | 1/1980 | Jeris | 210/622 |
| 4,188,289 | 2/1980 | Besik | 210/151 |
| 4,192,742 | 3/1980 | Bernard et al. | 210/150 |
| 4,202,291 | 5/1980 | Kominami et al. | 119/3 |

*Primary Examiner*—John Adee
*Attorney, Agent, or Firm*—Darrell E. Hollis

[57] ABSTRACT

A biological filter system has a bed of buoyant granules a portion of which extends above the surface of the fluid. The bed is disposed above the effluent outlet. Distubutor and receiving means are provided by which the filter can be backwashed.

29 Claims, 1 Drawing Figure

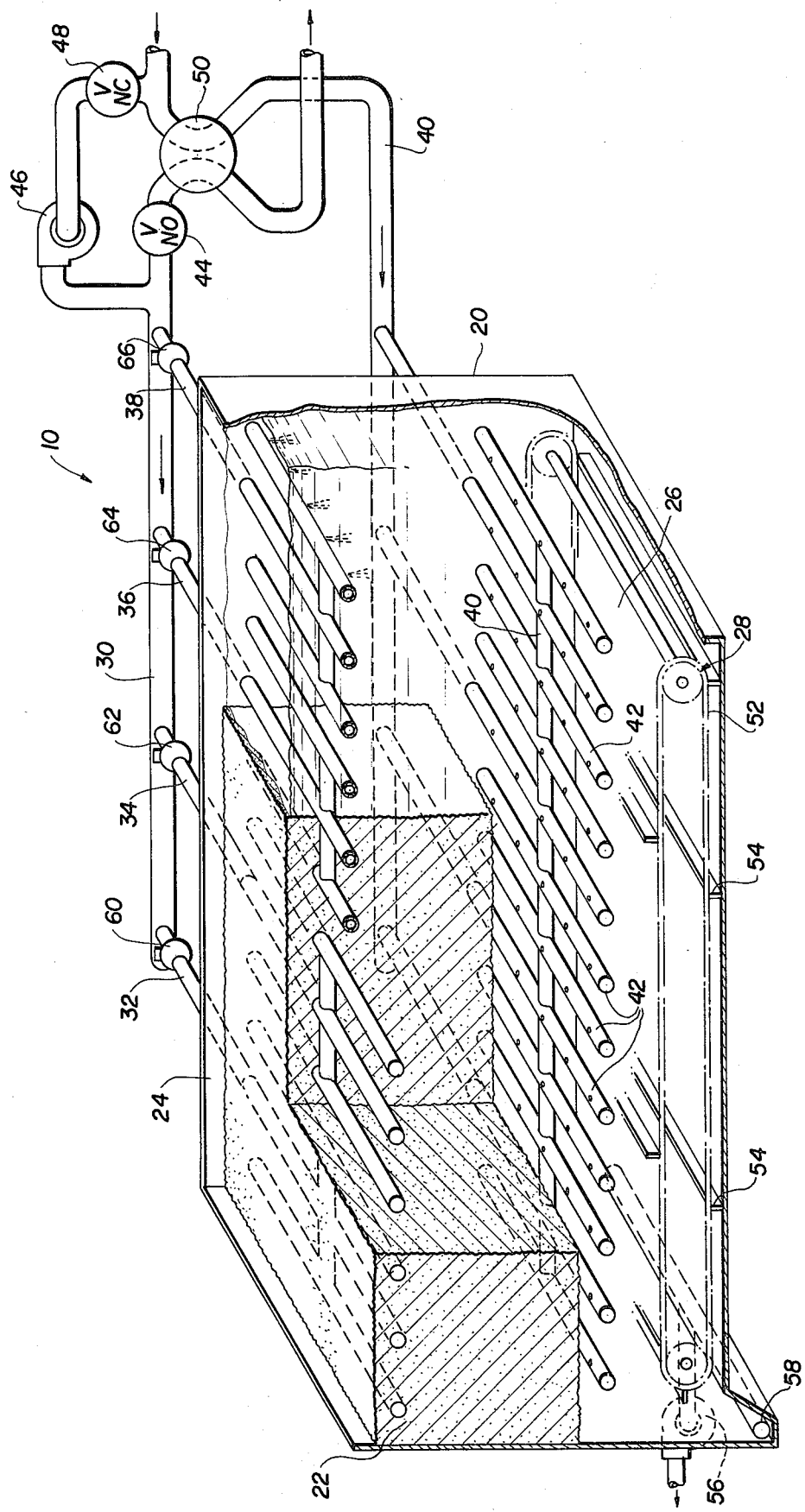

GRANULAR FLUID BIOFILTER REVERSING

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

The present invention relates to the general field of water filtering systems used in a fish rearing environment and more specifically to such systems in which solid wastes, ammonia and other organic impurities harmful to fish are present and need to be eliminated on a continuing basis from a container or tank remote from the location of the fish.

The vast majority of conventional filtering systems are employed in the same locations as the fish and as a result the filter media is placed either on the bottom of the tank or pond or otherwise maintained beneath the water area in which the fish live. In this type of a fish rearing environment it is the general practice to wash the filter media by using upward flow of fluid cleansing action. Such method suffers the disadvantage of the accumulated solid wastes being carried upward and into the area in which the fish are located, resulting in increased pollution of the water and increased difficulty in capturing and removing such waste. In fish rearing water filtering systems of the type that is located in a tank remote from the fish rearing environment and in which the water is continually circulated between the two locations, it is possible to avoid the above-mentioned disadvantage. Conventional systems of this type are exemplified by U.S. Pat. Nos. 3,842,804 and 3,886,902, wherein the influent and effluent are separated by the filter media and the fluid flow during the filtering process is continuous and always in the same direction. Such systems are generally inefficient, requiring large capacity tanks and long periods of time to accomplish the desired water purification because the filter media is not used to its best advantage. Specifically, in these types of water filter systems the effectiveness of the filter media in supporting the bacteria necessary to ingest and oxidize the impurities (such as ammonia) is poor because only the first layers of the exposed side of the filter media receives the high concentration of organic-laden water. The later-exposed layers of the filter media are therefore less effective in providing an environment for bacteria growth.

The use of filter media consisting of buoyant plastic rings, each having a diameter of 3½ inches is known. In a tank having a filter plan area of 300 square feet, a minimum six-foot filter media depth is required to provide the necessary removal of all ammonia and other impurities in the water. For practical and economical reasons, such depth requirement is not feasible.

SUMMARY OF THE INVENTION

An object of the present invention to provide a water filtering system of the type used in fish rearing environments that is more efficient than those heretofore available.

It is a further object to provide a water filtering system in which a fluidized filter media is capable of being cleansed without interruption of the filtering process and without being removed from the tank.

It is another object of this invention to provide a water filtering system in which the flow of the fluid through the filtering media can be reversed without any loss of filtering time, or filter efficiency.

Yet another object of this invention is to provide an improved fluidized filtering media that requires less depth than conventional fluidized filtering beds and is effective in inhibiting undesired algae growth.

These and other objects of the invention are obtained by providing a tank or container water filtering system including as the filter media a bed of granules having a buoyancy such that approximately three percent of the entire volume of granules rest above the surface of the water. Located just below the surface of the water and in the upper region of the bed of granules is a fluid flow distribution network called the high grid. Below the bed of granules is a second fluid flow distribution network called the low grid. Located beneath the low grid on the floor of the tank is the solid waste removal system that includes a sludge scraping apparatus. Influent to the filtering tank is delivered by a gravity feed system to either the high grid or low grid as directed by electrically operated valves for distribution flow through the bed of granules. Effluent exits through the opposite grid and is delivered to a remote location for an aeration operation that is well known in the art and not considered a part of this invention. On a regularly scheduled basis the electrically operated valves reverse the flow of the influent-effluent cycle so that during approximately one-half the filtering time the high grid acts to deliver influent and the remaining time serves to remove the effluent.

Both the high and low grids are made up of interconnected pipes through which either inflow or outflow is evenly spread. The high grid is segmented into several separate panels called wash panels that can be employed one at a time in a predetermined sequencing order. During controlled short periods of time each separate panel is employed to deliver all of the influent resulting in accelerated influent flow so that the portion of the granular filter bed in close proximity thereto is "washed" by down-directed jets of influent. During the wash mode the total amount of influent is unchanged so that the quantity of effluent out the low grid is not altered and the entire filtering cycle is neither interrupted or changed. The array of washjets in each panel are close enough together so that all granules of the filter bed are eventually physically displaced and cleansed of any sediment, and the entire mass of the buoyant granular filter bed constitutes a perpetually fluidized bed in which each granule moves with respect to its neighbor under differential water velocities. The washjets are therefore able to displace the accumulated waste or sediment from each particle so that it can settle to the floor of the tank and be subsequently disposed of through use of the sludge scraping and disposal system.

The overall depth of the filter bed is determined by the effectiveness of the filter media. In the present invention, small irregularly shaped solid granules averaging about 5/16 inches in diameter have been found to be the most effective and result in a filter bed depth of two and one half feet for a 300 square foot filter plan area. Prior art filter beds using plastic rings or other non-solid granules of similar effectiveness have been found to require a six-foot depth bed. Further, the relationship of the total filter bed depth, small size of filter granules and intermittant fluid flow reversal has the effect of building maximum bacteria vigor on both the upper layers and bottom layers of the filter bed. During inflow, from the high grid, the top layers of the filter bed bacteria growth is strengthened. The bottom layer bacteria having been previously invigorated during inflow from the low grid are also more effective.

The buoyancy of the granules result in additional advantages. Being located partly above the surface of the water, the granules can be periodically replaced by conventional pumping or displacement by flow over a weir by controlled overflows into separate containing means for separate cleaning or storage. In addition, sunlight is shaded so that algae growth is inhibited. The filter bed also acts as an insulating barrier resulting in easier and more efficient temperature control.

Other objects, advantages and novel features of the present invention will become apparent from the following detailed description of the present invention when considered in conjunction with the accompanying drawings.

BRIEF DESCRIPTION OF THE DRAWINGS

The FIGURE illustrates the components of the granular fluid biofilter reversing system.

DESCRIPTION OF THE PREFERRED EMBODIMENT

Referring to the drawings wherein reference numeral 10 indicates the granular fluid biofilter reversing system, tank or container 20 is seen to house filter media 22, upper or high grid 24, lower or low grid 24 and sludge removal system 28. Filter media 22 consists of a bed of granules having predetermined buoyancy such that approximately three percent of the entire volume of granules rest above the surface of the water supported by the remaining 97%. Each granule is irregularly shaped and has an average diameter of approximately 5/16 inch and in the preferred embodiment is comprised of polyethylene although any suitable buoyant material capable of supporting bacteria growth may be used. In a tank having 300 square feet of plan area, a filter media bed depth of 2½ feet is preferred and is sufficient to provide enough total filter media surface effective to support the bacteria growth necessary to transform the unwanted fish produced ammonia products into oxidized, harmless substances.

High grid 24 consists of header 30 and separate wash panels 32, 34, 36, and 38, each having a plurality of interconnected pipe segments the purpose of which will be explained in greater detail below. Low grid 26 consists of header 40 out of which extends a plurality of pipe segments 42. Connected to header 30 through either of two fluid paths, either through normally open wash mode valve 44 or via wash pump 46 and normally closed wash mode valve 48 is a four-way flow reversal valve 50 having two operational positions. When the four-way flow reversal valve is in the position depicted in phantom view in FIG. 1, influent enters through valve 50 into header 40 and into container 20 via tiny holes provided in pipe segments 42. Effluent exits through similar holes provided in the pipe segments of panels 32, 34, 36, and 38 through header 30, normally open valve 44 and four-way valve 50. In the second position of four-way valve 50, influent is directed through valve 50, normally open wash mode valve 44, header 30 and into container 20 via the holes provided in the pipe segments of wash panels 32, 34, 36, and 38. Effluent exits container 20 through the holes in pipe segments 42, header 40 and four-way valve 50. Fluid flow reversal four-way valve 50 is placed in each of its operating positions approximately equal time.

Sludge removal system 28 located below low grid 26 includes sludge scraping mechanism 52 having an endless chain with flights 54 that traverse and scrape sludge that has settled on the floor of tank 20 into sludge sump 56 at controlled intervals. Sludge suction header 58 withdraws sludge from sludge sump 54 periodically whereupon it is transferred to a sludge disposal area remote from the tank 20. Sludge removal is thus accomplished without interruption of the filtering process.

In operation, the granular fluid biofilter reversing system 10 provides continuous filtering of influent without loss of efficiency due to build up of waste in the filter media bed and the tank. As explained above, approximately ½ of the time unfiltered influent enters four-way valve through header 40 and out of holes provided in pipe segments 42 into tank 20. Solid particles of waste immediately settle to the bottom and removed by sludge removal system 28. The remaining unfiltered water travels upward through filter media bed 22 whereupon the waste ammonia and other waste organic substances are acted upon by the bacteria-rich granular particles of the filter bed. Effluent exits from tank 20 through high grid 24, normally open valve 44 and four-way valve 50.

Filter flow direction is reversed by actuation of four-way valve 50 such that influent is directed through normally open valve 44 to header 30 and into tank 20 via the holes provided in the wash panel segments 32, 34, 36, and 38 in a downward direction through filter bed 22. Unfiltered water is immediately brought into contact with the upper levels of the filter bed 22 with the heavier solid waste products settling to the floor of tank 20. It can be appreciated that providing for reversal of the fluid flow through the filter media results in more efficient exposure of the granular particles to the unfiltered water.

A wash mode feature of the system is provided during the time influent is directed to high grid 24 as explained above. Wash panels 32, 34, 36, and 38 may be employed one at a time to wash the filter media with down directed jets of water turned on when the wash mode operation is actuated. Manual or electrically operated valves 60, 62, 64, and 66 are programmed so that each wash panel 32, 34, 36, and 38 can exclusively receive the influent from header 30 on a rotating basis so that the water velocity is four times greater through each of the wash panels.

During the wash mode cycle, wash pump 46 is actuated, normally closed wash mode valve 48 is opened and normally open valve 44 is closed. Influent is directed from four-way valve 50 through wash mode valve 48, wash pump 46, and header 30 into one of wash panels 32, 34, 36, or 38 that is programmed to receive the influent at that time. The array of holes in each of the wash ponds 32, 34, 36, and 38 are provided close enough together so that all of the granules of the filter bed in close proximity are washed of their sediment load and physically displaced by the jet-like action of the influent. The physical displacement action of the granules constitute a perpetually fluidized bed with each particle moving with respect to its neighbor under differential water velocities. The washed sediment is allowed to settle through the fluidized bed onto the floor of tank 20 whereupon it is removed by action of sludge removal system 28. The result of this washing mode procedure is a repeatedly rejuvenated filter media bed without the necessity of removing such filter media from the tank and without having to transport the dirty but relatively dilute water to another container for settling of the waste solids. Further, the water used in the wash mode is filtered during its travel through the filter media and exits through low grid 26 just as in the non-wash mode or regular operation so that return flow to the fish rearing ponds is not interrupted or slowed.

From the preceeding description of the preferred embodiments, it is evident that the objects of the invention are attained and that an improved fluid flow filter system is provided for use in a fish rearing environment. Although the invention has been described and illustrated in detail, it is to be clearly understood that the same is by way of illustration and example only and is not to be taken by way of limitation. The spirit and scope of this invention are to be limited by the terms of the appended claims.

We claim:

1. A fluid filter system comprising
   a. a fluid-holding container;
   b. first means through which influent enters said container to be filtered;
   c. second means through which effluent exits said container;
   d. a fluid filter bed comprised of a mass of buoyant granules, said fluid filter bed being disposed above said second means; and
   e. fluid flow reversal means for periodically causing said influent to enter said container through said second means and said effluent to exit said container through said first means.

2. The fluid filter bed of claim 1 wherein said mass of buoyant granules includes bacteria growing therein, said fluid flow reversal means providing maximum bacteria growth within said means of buoyant granules by strengthening bacteria growth adjacent the top of said fluid filter bed when fluid enters said container through said first means and strengthening said bacteria growth adjacent the bottom of said fluid filter bed when fluid enters said container through said second means.

3. The fluid filter system of claim 1 wherein said first means is segmented into a plurality of sections, each one of which may be individually connected to said influent in a wash mode to provide said influent at an accelerated rate for cleansing said filter bed.

4. The fluid filter system of claim 1 having a wash mode that utilizes individual sections of said first means to cleanse said filter means.

5. The fluid filter system of claim 1 having a sludge disposal system.

6. The fluid filter system of claim 1 wherein said first means is located just below the surface of the water fluid in said container within said filter means.

7. The fluid filter system of claim 3 wherein said first means is located just below the surface of the water in said container means.

8. The fluid filter system of claim 1 wherein said second means consists of a plurality of pipe segments, each pipe segment having holes through which fluid flows.

9. The fluid filter system of claim 8 having a sludge disposal system located at the bottom of said container.

10. The fluid filter system of claim 5 wherein said sludge disposal system is located beneath said first, second and filter means.

11. The fluid filter system of claim 5 wherein said sludge disposal system includes a sludge scraping means.

12. The fluid filter system of claim 1 wherein between two to five percent (2–5%) of the total volume of said filter bed is located above the surface of the fluid in said container.

13. The fluid filter system of claim 2 wherein said buoyant granules are irregularly shaped solid particles averaging less than ½ inch in cross-section.

14. The fluid filter system of claim 1 wherein said flow reversal means includes a four-way valve.

15. The fluid filter system of claim 1 wherein a portion of the total volume of said buoyant granules extends upward above the surface of the fluid in said container whereby the bacteria growing within said filter bed are protected from solar radiation.

16. A fluid filter system comprising:
   a. a fluid-holding container;
   b. first means through which influent enters said container to be filtered;
   c. second means through which effluent exists said container;
   d. a fluid filter bed comprised of a mass of buoyant granules having bacteria growth therein, said fluid filter bed being disposed above said second means; and
   e. fluid flow reversal means for periodically causing said influent to enter said container through said second means and said effluent to exit said container through said first means thereby providing maximum bacteria growth within said mass of buoyant granules by strengthening bacteria growth adjacent the top of said fluid filter bed when fluid enters said container through said first means and strengthening said bacteria growth adjacent the bottom of said fluid filter bed when fluid enters said container through said second means.

17. The fluid filter system of claim 16 wherein a portion of the total volume of said buoyant granules extends upward above the surface of the fluid in said container whereby the bacteria growth within said filter bed are protected from solar radiation.

18. The fluid filter system of claim 17 wherein between two to five percent (2–5%) of the total volume of said filter bed is located above the surface of the fluid in said container.

19. The fluid filter system of claim 16 wherein said buoyant granules are irregularly shaped solid particles averaging less than ½ inch in cross-section.

20. The fluid filter system of claim 16 wherein said first means is segmented into a plurality of sections, each one of which may be individually connected to said influent in a wash mode to provide said influent at an accelerated rate for cleansing said filter bed.

21. The fluid filter system of claim 16 having a wash mode that utilizes individual sections of said first means to cleanse said filter means.

22. The fluid filter system of claim 16 having a sludge disposal system.

23. The fluid filter system of claim 16 wherein said first means is located just below the surface of the water fluid in said container within said filter means.

24. The fluid filter system of claim 18 wherein said first means is located just below the surface of the water in said container means.

25. The fluid filter system of claim 16 wherein said second means consists of a plurality of pipe segments, each pipe segment having holes through which fluid flows.

26. The fluid filter system of claim 23 having a sludge disposal system located at the bottom of said container.

27. The fluid filter system of claim 22 wherein said sludge disposal system is located beneath said first, second and filter means.

28. The fluid filter system of claim 22 wherein said sludge disposal system includes a sludge scraping means.

29. The fluid filter system of claim 18 wherein said flow reversal means includes a four-way valve.

* * * * *